United States Patent
Power et al.

(10) Patent No.: US 10,005,321 B2
(45) Date of Patent: Jun. 26, 2018

(54) AXLE ASSEMBLY

(71) Applicant: ArvinMeritor Technology, LLC, Troy, MI (US)

(72) Inventors: Michael Andrew Power, Troy, MI (US); J Neil Schunke, Marion, NC (US); William James, Swannanoa, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 1 day.

(21) Appl. No.: 15/267,173

(22) Filed: Sep. 16, 2016

(65) Prior Publication Data

US 2018/0079256 A1    Mar. 22, 2018

(51) Int. Cl.
| B60B 35/08 | (2006.01) |
| B60B 35/04 | (2006.01) |
| B60T 1/06  | (2006.01) |
| B60B 35/02 | (2006.01) |

(52) U.S. Cl.
CPC .............. *B60B 35/08* (2013.01); *B60B 35/04* (2013.01); *B60B 35/025* (2013.01); *B60B 2380/14* (2013.01); *B60B 2380/80* (2013.01); *B60T 1/067* (2013.01)

(58) Field of Classification Search
CPC ....... B60B 35/04; B60B 35/08; B60B 35/025; B60B 2380/80; B21K 1/063
USPC ...................................... 301/124.1
See application file for complete search history.

(56) References Cited

U.S. PATENT DOCUMENTS

| 2,227,436 A | * | 1/1941 | Buckwalter | B21K 1/10 72/208 |
| 3,701,564 A | * | 10/1972 | Puzik | B21K 1/06 301/131 |
| 3,886,649 A | * | 6/1975 | Simon | B21C 23/14 228/112.1 |
| 4,298,155 A | * | 11/1981 | Palovcik | B21K 1/06 219/137 R |
| 4,363,522 A | * | 12/1982 | Palovcik | B60B 35/08 301/131 |
| 6,230,540 B1 | | 5/2001 | Wilch et al. | |
| 6,439,672 B1 | | 8/2002 | Simon | |
| 6,701,763 B2 | | 3/2004 | Varela | |
| 8,801,000 B1 | * | 8/2014 | Power | B60P 1/027 280/6.151 |
| 2010/0308612 A1 | * | 12/2010 | Antunes | B21J 5/08 295/36.1 |
| 2014/0232177 A1 | * | 8/2014 | Power | B60B 35/04 301/131 |
| 2014/0319900 A1 | * | 10/2014 | Bowyer | B60T 1/06 301/6.1 |

* cited by examiner

*Primary Examiner* — Kip T Kotter
(74) *Attorney, Agent, or Firm* — Brooks Kushman P.C.

(57) ABSTRACT

An axle assembly having an axle, a brake spider and a bearing collar. The axle may have first and second transition regions. The first transition region may extend between first and second cylindrical portions of the axle. The second transition region may extend between second and third cylindrical portions of the axle. The brake spider may be disposed on the second cylindrical portion. The bearing collar may be disposed on the second transition region.

21 Claims, 5 Drawing Sheets

AXLE ASSEMBLY

TECHNICAL FIELD

This disclosure relates to an axle assembly that has an axle that includes transition regions between cylindrical portions.

BACKGROUND

An axle assembly having a brake flange and a brake shoulder is disclosed in U.S. Pat. No. 6,701,763.

SUMMARY

In at least one embodiment, an axle assembly is provided. The axle assembly may include an axle, a brake spider, and a bearing collar. The axle may be disposed around an axis and may include a first cylindrical portion, a second cylindrical portion, a third cylindrical portion, a first transition region, and a second transition region. The first cylindrical portion may have a first outside diameter. The second cylindrical portion may have a second outside diameter. The third cylindrical portion may have a third outside diameter. The second outside diameter may be less than the first outside diameter. The third outside diameter may be less than the second outside diameter. The first transition region may extend from the first cylindrical portion to the second cylindrical portion. The first transition region may have an exterior surface that has a first curved portion, and a second curved portion. The exterior surface may face away from the axis. The first curved portion may be concave with respect to the axis. The second curved portion may be convex with respect to the axis. The second transition region may extend from the second cylindrical portion to the third cylindrical portion. The brake spider may be disposed on the second cylindrical portion. The bearing collar may be disposed on the second transition region.

In at least one embodiment, an axle assembly is provided. The axle assembly may include an axle that may be disposed around an axis. The axle may include a first cylindrical portion, a second cylindrical portion, a third cylindrical portion, a first transition region, and a second transition region. The first cylindrical portion may have a first outside diameter. The second cylindrical portion may have a second outside diameter and an axial length. The third cylindrical portion may have a third outside diameter. The second outside diameter may be less than the first outside diameter. The third outside diameter may be less than the second outside diameter. The first transition region may extend from the first cylindrical portion to the second cylindrical portion and may have a first axial length. The second transition region may extend from the second cylindrical portion to the third cylindrical portion and may have a second axial length. The axial length of the second cylindrical portion may be less than the first axial length and the second axial length.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
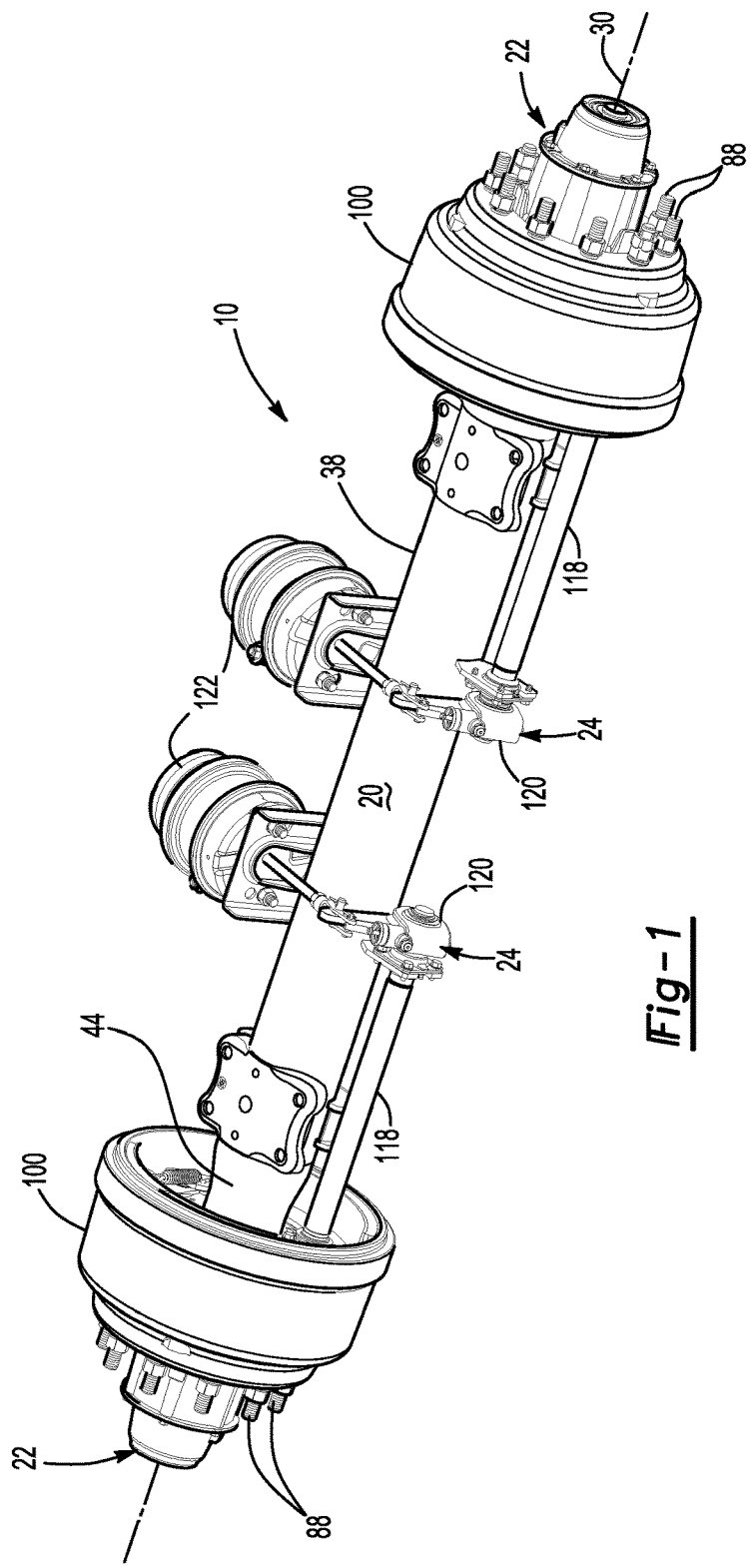
FIG. 1 is a perspective view of an axle assembly.

Referring to FIG. 1, an example of an axle assembly 10 is shown. The axle assembly 10 may be provided with a vehicle, such as motor vehicle or a trailer that may be provided with a motor vehicle. In at least one embodiment, the axle assembly 10 may include an axle 20, at least one wheel end assembly 22, and a brake subsystem 24.

The axle 20 may be disposed around or may extend along an axis 30. As is best shown with reference to FIGS. 3 and 4, the axle 20 may include a pair of opposing ends 32, an internal surface 34, an axle hole 36, a first cylindrical portion 38, a second cylindrical portion 40, a third cylindrical portion 42, a first transition region 44, and a second transition region 46. More specifically, the axle 20 may have a single first cylindrical portion 38 and may have two second cylindrical portions 40, third cylindrical portions 42, first transition regions 44, and second transition regions 46 that may be provided at opposite ends of the axle 20.

Figure 3:
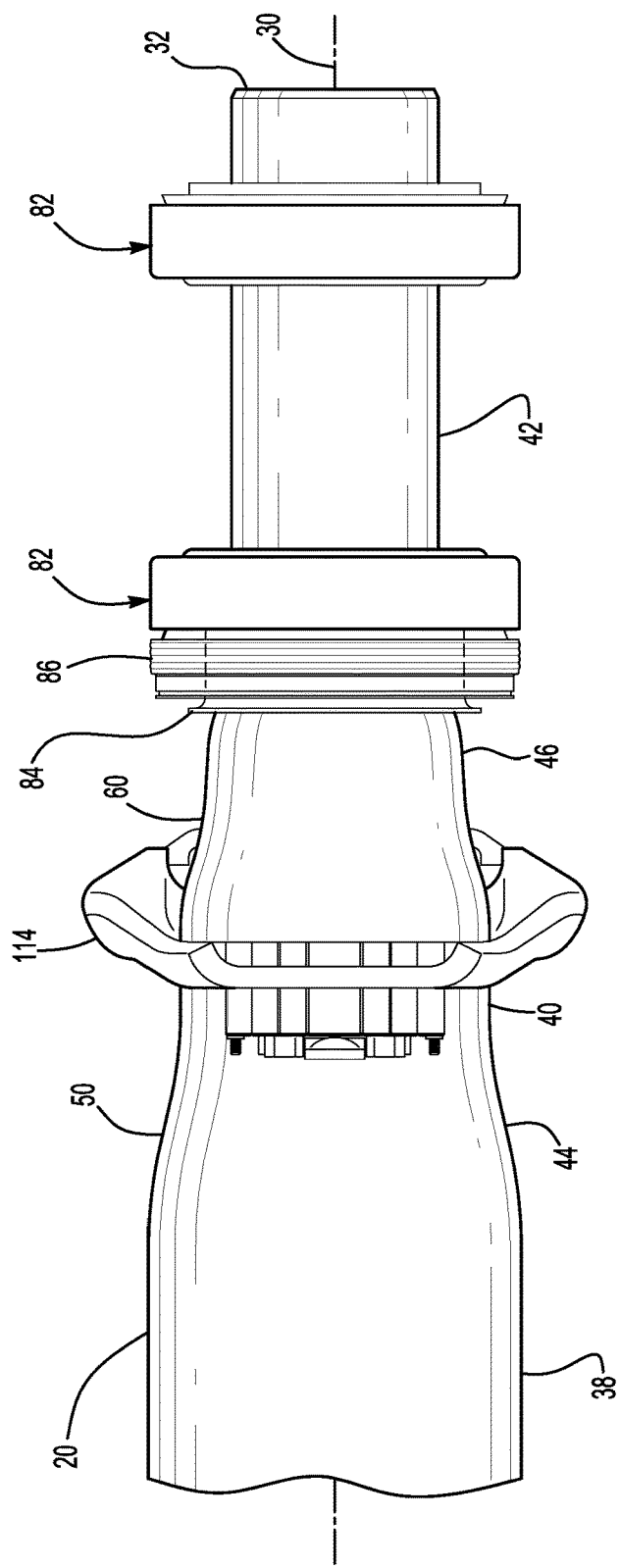
FIG. 3 is a side view of the portion of the axle assembly shown in FIG. 2.
Figure 4:
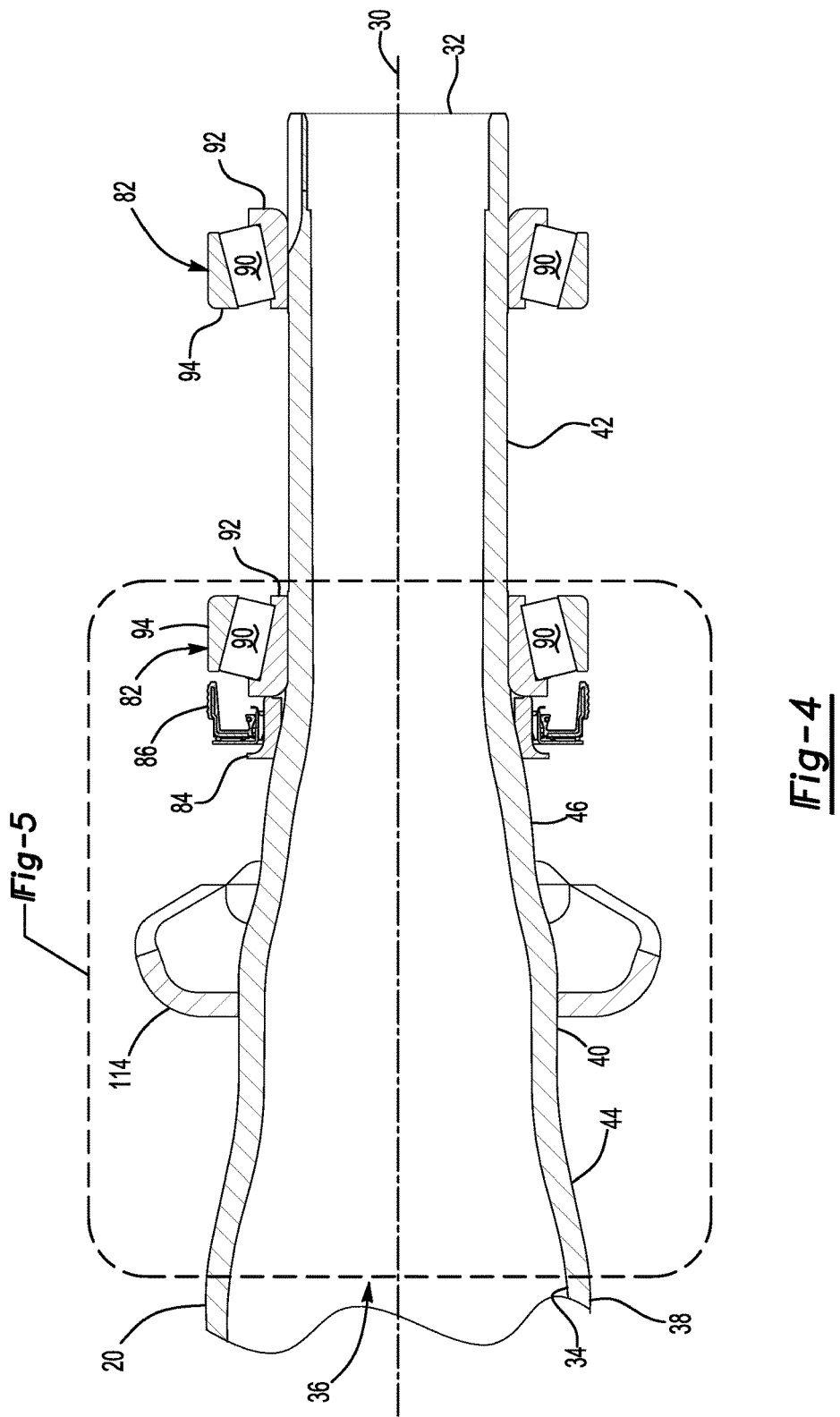
FIG. 4 is a side section view of FIG. 3 through an axis of the axle.

Referring to FIGS. 3 and 4, the opposing ends 32 or end surfaces may be disposed at opposite ends of the axle 20. Each end 32 may be disposed around the axis 30.

Referring to FIG. 4, the internal surface 34 may extend from one end 32 to the opposite end 32 of the axle 20. The internal surface 34 may be spaced apart from the axis 30 and may extend around the axis 30. As such, the internal surface 34 may partially or completely define the axle hole 36.

The axle hole 36 may extend between opposing ends 32 of the axle 20. Accordingly, the axle 20 may be configured as a hollow tube in one or more embodiments.

Figure 2:
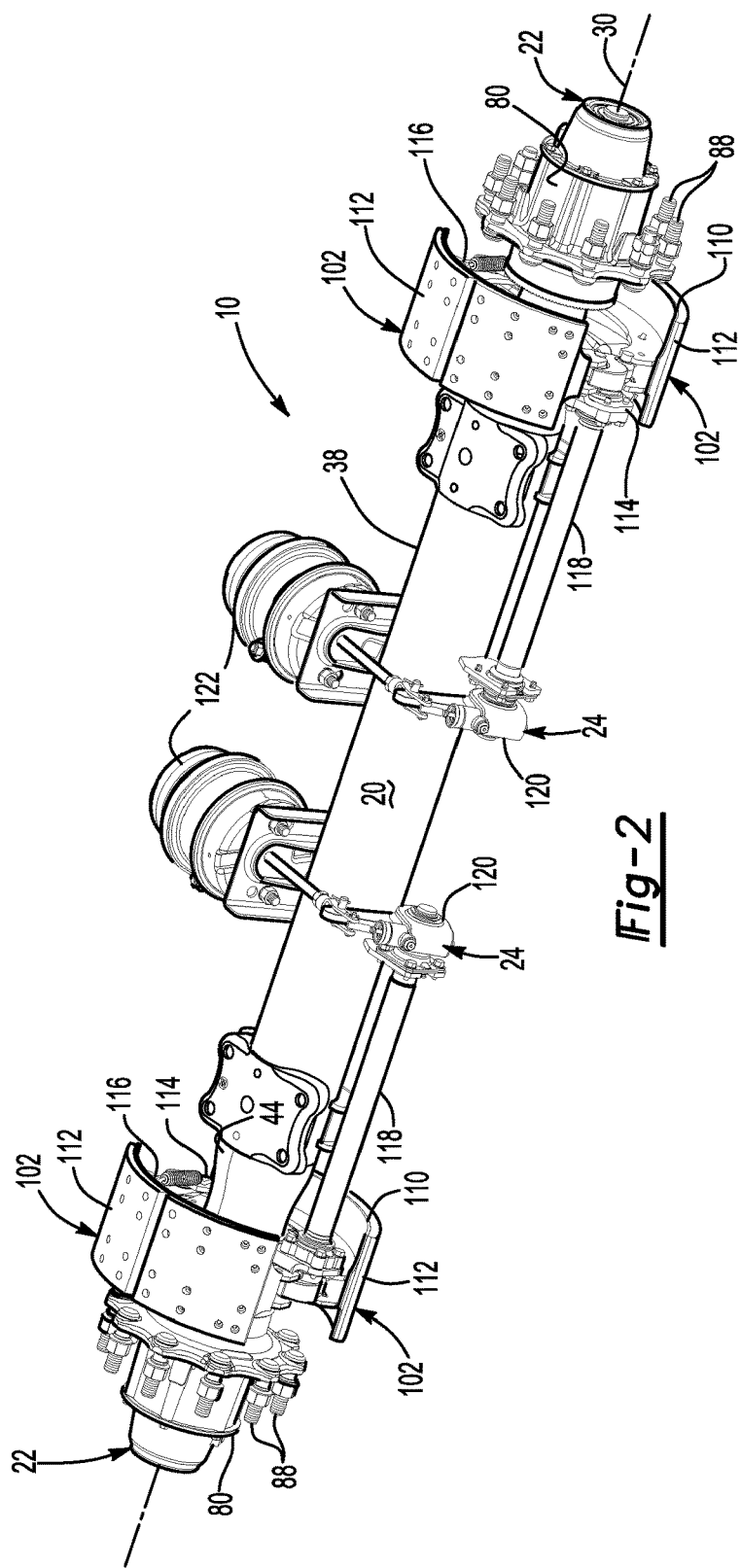
FIG. 2 is a perspective view of the axle assembly of FIG. 1 with the brake drums removed.
Figure 5:
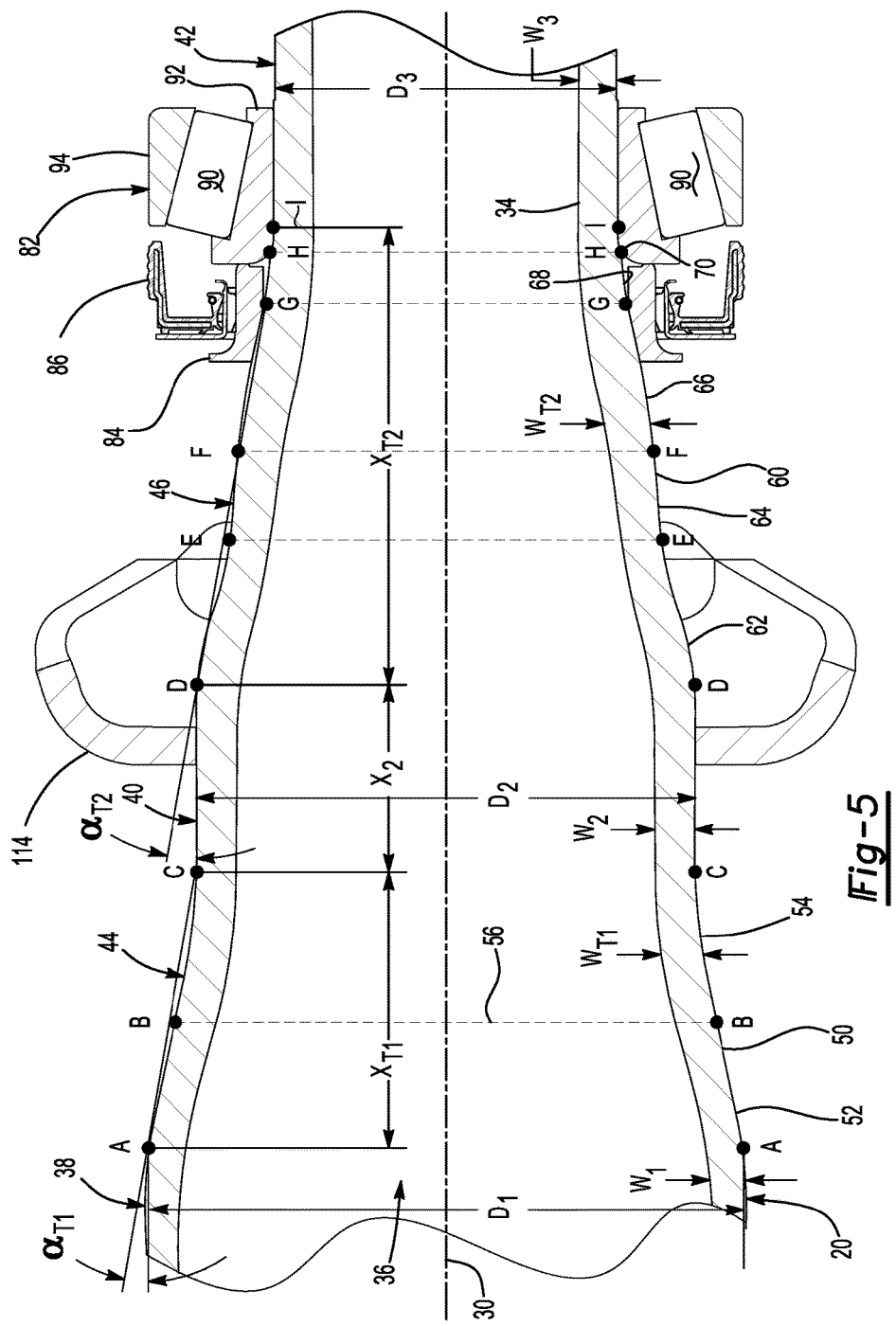
FIG. 5 is a magnified view of a portion of FIG. 4.

Referring to FIGS. 2 and 3, the first cylindrical portion 38 may be disposed at the center of the axle 20. As such, the first cylindrical portion 38 may be disposed between two first transition regions 44. As is best shown in FIG. 5, the first cylindrical portion 38 may have a first outside diameter $D_1$. The first outside diameter $D_1$ may be disposed at a substantially constant radial distance from the axis 30. As such, an external surface of the first cylindrical portion 38 may be disposed substantially parallel to the axis 30. The first outside diameter $D_1$ may be at least 6 inches (15.24 cm).

The first cylindrical portion 38 may also have a first wall thickness $W_1$. The first wall thickness $W_1$ may be a thickness of the wall of the axle 20 that forms the first cylindrical portion 38 and may be measured from the internal surface 34 to the first outside diameter $D_1$.

Referring to FIGS. 3 and 5, the second cylindrical portion 40 may be spaced apart from the first cylindrical portion 38. More specifically, the second cylindrical portion 40 may be disposed between the first transition region 44 and the second transition region 46. As is best shown in FIG. 5, the second cylindrical portion 40 may have a second outside diameter $D_2$. The second outside diameter $D_2$ may be disposed at a substantially constant radial distance from the axis 30. As such, an external surface of the second cylindrical portion 40 may be disposed substantially parallel to the axis 30. The second outside diameter $D_2$ may be less than the first outside diameter $D_1$.

The second cylindrical portion 40 may also have a second wall thickness $W_2$. The second wall thickness $W_2$ may be a thickness of the wall of the axle 20 that forms the second cylindrical portion 40 and may be measured from the internal surface 34 to the second outside diameter $D_2$. The second wall thickness $W_2$ may be greater than the first wall thickness $W_1$.

The second cylindrical portion 40 may also have an axial length $X_2$. The axial length $X_2$ may be a distance that the second cylindrical portion 40 extends along or parallel to the axis 30. For instance, the second cylindrical portion may have an axial length of approximately 2 inches (5 cm).

Referring to FIGS. 3 and 5, the third cylindrical portion 42 may be spaced apart from the first cylindrical portion 38 and the second cylindrical portion 40. More specifically, the third cylindrical portion 42 may be disposed between the second transition region 46 and an adjacent end 32 of the axle 20. As is best shown in FIG. 5, the third cylindrical portion 42 may have a third outside diameter $D_3$. The third outside diameter $D_3$ may be disposed at a substantially constant radial distance from the axis 30. As such, an external surface of the third cylindrical portion 42 may be disposed substantially parallel to the axis 30. The third outside diameter $D_3$ may be less than the first outside diameter $D_1$ and the second outside diameter $D_2$.

The third cylindrical portion 42 may also have a third wall thickness $W_3$. The third wall thickness $W_3$ may be a thickness of the wall of the axle 20 that forms the third cylindrical portion 42 and may be measured from the internal surface 34 to the third outside diameter $D_3$. The third wall thickness $W_3$ may be greater than the first wall thickness $W_1$.

The third cylindrical portion 42 may also have an axial length that may be greater than the axial length $X_2$ of the second cylindrical portion 40. The axial length may be a distance that the third cylindrical portion 42 extends along the axis 30. The third cylindrical region 42 may or may not extend from an end 32 of the axle 20. In FIG. 3, the third cylindrical region 42 is shown extending from the end 32 of the axle 20; however, it is contemplated that the third cylindrical region 42 may terminate before the end 32 of the axle 20 or that the diameter of the axle 20 may vary between the end of the third cylindrical region 42 and the end 32 of the axle 20. For instance, a smaller cylindrical portion or fourth cylindrical region may be provided between the third cylindrical region 42 and the end 32 of the axle 20 in one or more embodiments.

Referring to FIGS. 3 and 5, the first transition region 44 may extend from the first cylindrical portion 38 to the second cylindrical portion 40. As is best shown in FIG. 5, the first transition region 44 may extend from point A to point C and may not have a constant outside diameter or constant inside diameter. As such, the first transition region 44 may have an exterior surface 50 that may face away from the axis 30 and at least a portion of the exterior surface 50 may be nonlinear or may have a nonlinear cross section. The exterior surface 50 of the first transition region 44 may have a first curved portion 52 and a second curved portion 54.

The first curved portion 52 may extend from the first cylindrical portion 38 toward or to the second curved portion 54. In the configuration shown in FIG. 5, the first curved portion 52 extends from point A to point B. The first curved portion 52 may curve toward the axis 30. As such, the first curved portion 52 may be "concave downward" or concave with respect to the axis 30. The first curved portion 52 may be nonlinear and may have a constant radius of curvature in one or more embodiments.

The second curved portion 54 may extend from the second cylindrical portion 40 toward or to the first curved portion 52. In the configuration shown in FIG. 5, the second curved portion 54 extends from point B to point C. In such a configuration, the first curved portion 52 and the second curved portion 54 may intersect at an inflection line 56. The inflection line 56 may extend around the axis 30 and may designate or comprise inflection points at which the curvature of the first transition region 44 changes between concave and convex. The second curved portion 54 may curve away from the axis 30. As such, the second curved portion 54 may be "concave upward" or convex with respect to the axis 30. The second curved portion 54 may be nonlinear and may have a constant radius of curvature in one or more embodiments.

The first transition region 44 may have a first transition region slope $\alpha_{T1}$. The first transition region slope $\alpha_{T1}$ may be measured with respect to the axis 30 and may the slope of the first transition region 44 along its axial length from the first cylindrical portion 38 to the second cylindrical portion 40 (e.g., from the first outside diameter $D_1$ at point A to the second outside diameter $D_2$ at point C).

The first transition region 44 may also have a first transition region wall thickness $W_{T1}$. The first transition region wall thickness $W_{T1}$ may be a thickness of the wall that forms the first transition region 44 and may be measured from the internal surface 34 to an external surface of the first transition region 44 that may be disposed opposite the internal surface 34. The first transition region wall thickness $W_{T1}$ may not be constant and may vary along its axial length; however, the first transition region wall thickness $W_{T1}$, may greater than the first wall thickness $W_1$ of the first cylindrical portion 38.

The first transition region 44 may also have a first transition region axial length $X_{T1}$, which may also be referred to as a first axial length. The first axial length $X_{T1}$ may be a distance that the first transition region extends along the axis 30 and may be greater than the axial length $X_2$ of the second cylindrical portion 40.

Referring to FIGS. 3 and 5, the second transition region 46 may extend from the second cylindrical portion 40 to the third cylindrical portion 42. As is best shown in FIG. 5, the second transition region 46 may not have a constant outside diameter or constant inside diameter. As such, the second transition region 46 may have an exterior surface 60 that may face away from the axis 30 and at least a portion of the exterior surface 60 may be nonlinear or may have a nonlinear cross section. In at least one embodiment, the exterior surface 60 of the second transition region 46 may have a first arcuate portion 62, a second arcuate portion 64, a third arcuate portion 66, a fourth arcuate portion 68, and a radial portion 70. It is also contemplated that the second transition region 46 may be provided without one or more of the arcuate portions in one or more embodiments.

The first arcuate portion 62 may extend from the second cylindrical portion 40 to the second arcuate portion 64. In the configuration shown in FIG. 5, the first arcuate portion 62 extends from point D to point E. The first arcuate portion 62 may curve toward the axis 30. As such, the first arcuate portion 62 may be "concave downward" or concave with respect to the axis 30. The first arcuate portion 62 may be nonlinear and may have a constant radius of curvature in one or more embodiments.

The second arcuate portion 64 may extend from the first arcuate portion 62 to the third arcuate portion 66. In the configuration shown in FIG. 5, the second arcuate portion 64 extends from point E to point F. In such a configuration, the first arcuate portion 62 and the second arcuate portion 64 may intersect at an inflection line located at point E and where point E is revolved one revolution about the axis 30. The inflection line at point E may extend around the axis 30 and may designate or comprise inflection points at which the curvature of the second transition region 46 changes between concave and convex. The second arcuate portion 64 may curve away from the axis 30. As such, the second arcuate portion 64 may be "concave upward" or convex with respect to the axis 30. The second arcuate portion 64 may be nonlinear and may have a constant radius of curvature in one or more embodiments.

The third arcuate portion 66 may extend from the second arcuate portion 64 to the fourth arcuate portion 68. In the configuration shown in FIG. 5, the third arcuate portion 66 extends from point F to point G. In such a configuration, the second arcuate portion 64 and the third arcuate portion 66 may intersect at an inflection line located at point F and where point F is revolved one revolution about the axis 30. The inflection line at point F may extend around the axis 30 and may designate or comprise inflection points at which the curvature of the second transition region 46 changes between convex and concave. The third arcuate portion 66 may curve toward the axis 30. As such, the third arcuate portion 66 may be "concave downward" or concave with respect to the axis 30. The third arcuate portion 66 may be nonlinear and may have a constant radius of curvature in one or more embodiments.

The fourth arcuate portion 68 may extend from the third arcuate portion 66 to the radial portion 70. In the configuration shown in FIG. 5, the fourth arcuate portion 68 extends from point G to point H. In such a configuration, the third arcuate portion 66 and the fourth arcuate portion 68 may intersect at an inflection line located at point G and where point G is revolved one revolution about the axis 30. The inflection line at point G may extend around the axis 30 and may designate or comprise inflection points at which the curvature of the second transition region 46 changes between concave and convex. The fourth arcuate portion 68 may curve away from the axis 30. As such, the fourth arcuate portion 68 may be "concave upward" or convex with respect to the axis 30. The fourth arcuate portion 68 may be nonlinear and may have a constant radius of curvature in one or more embodiments.

The radial portion 70 may extend from the fourth arcuate portion 68 to third cylindrical portion 42. As such, the radial portion 70 may be disposed an opposite end of the second transition region 46 from the first arcuate portion 62. In the configuration shown in FIG. 5, the radial portion 70 extends from point H to point I. In such a configuration, the fourth arcuate portion 68 and the radial portion 70 may intersect at an inflection line located at point H and where point H is revolved one revolution about the axis 30. The inflection line at point H may extend around the axis 30 and may designate or comprise inflection points at which the curvature of the second transition region 46 changes. The radial portion 70 may curve away from the axis 30. As such, the radial portion 70 may be "concave upward" or convex with respect to the axis 30. The radial portion 70 may be nonlinear and may have a constant radius of curvature in one or more embodiments.

The second transition region 46 may have a second transition region slope $\alpha_{T2}$. The second transition region slope $\alpha_{T2}$ may be measured with respect to the axis 30 and may the slope of the second transition region 46 along its axial length from the second cylindrical portion 40 to the third cylindrical portion 42 (e.g., from the second outside diameter $D_2$ at point D to the third outside diameter $D_3$ at point I). The first transition region slope $\alpha_{T1}$ may be less than or less steep than the second transition region slope $\alpha_{T2}$. For instance, the second transition region slope $\alpha_{T2}$ may be approximately 14°. This increased slope may increase the strength of the axle tube proximate the second transition region to help withstand corner fatigue testing or stresses that occur when a vehicle is turning a corner under various cornering angle, weight, and speed conditions.

The second transition region 46 may also have a second transition region wall thickness $W_{T2}$. The second transition region wall thickness $W_{T2}$ may be a thickness of the wall that forms the second transition region 46 and may be measured from the internal surface 34 to an external surface of the second transition region 46 that may be disposed opposite the internal surface 34. The second transition region wall thickness $W_{T2}$ may not be constant and may vary along its axial length; however, the second transition region wall thickness $W_{T2}$ or a portion thereof may be greater than the first wall thickness $W_1$ of the first cylindrical portion 38, the second wall thickness $W_2$ of the second cylindrical portion 40, and the first transition region wall thickness $W_{T1}$.

The second transition region 46 may also have a second transition region axial length $X_{T2}$, which may also be referred to as a second axial length. The second axial length $X_{T2}$ may be greater than the axial length $X_2$ of the second cylindrical portion 40 and the first axial length $X_{T2}$ of the first transition region 44.

Referring to FIG. 1, the wheel end assembly 22 may be disposed on the axle 20 and may facilitate mounting and rotation of a vehicle wheel. A pair of wheel end assemblies 22 may be provided at opposite ends of the axle 20. As is best shown with reference to FIGS. 2 and 3, the wheel end assembly 22 may include a hub 80, a pair of wheel bearing assemblies 82, a bearing collar 84, and a seal 86.

Referring to FIG. 2, the hub 80 may be rotatably disposed on the axle 20. For example, the hub 80 may be rotatably disposed on the third cylindrical portion of the axle 20 and may be rotatable about the axis 30. The hub 80 may facilitate mounting of a wheel that supports a tire. For example, the hub 80 may have holes that receive mounting studs 88 that may facilitate mounting of a wheel to the hub 80. A lug nut may be threaded onto each mounting stud 88 to secure the wheel to the hub 80. In addition, a friction member of the brake subsystem 24, such as a brake drum, may be mounted to the hub 80, such as via the mounting studs 88, and may rotate with the hub 80 as will be discussed in more detail below.

Referring to FIGS. 3 and 4, a pair of wheel bearing assemblies 82 may be disposed near each end of the axle 20 and may rotatably support a corresponding hub 80. The wheel bearing assemblies 82 may be spaced apart from each other and may be disposed on the third cylindrical portion 42 of the axle 20. In at least one embodiment, one or more of the wheel bearing assemblies 82 may extend around an external surface of the third cylindrical portion 42 and may be received inside the hub 80. For convenience in reference, the wheel bearing assembly 82 that is disposed furthest from the first cylindrical portion 38 of the axle 20 or closest to an adjacent end 32 of the axle 20 may be referred to as an outboard wheel bearing assembly while the wheel bearing assembly 82 that is disposed closest to the first cylindrical portion 38 or furthest from an adjacent end 32 of the axle 20 may be referred to as an inboard wheel bearing assembly. It is also contemplated that the inboard and outboard wheel bearing assemblies 82 may be disposed on portions of the axle 20 that may have different diameters. For instance, the inboard wheel bearing assembly 82 may be disposed on the third cylindrical portion 42 while the outboard wheel bearing assembly 82 may be disposed on a fourth cylindrical portion that may have a smaller diameter than the third cylindrical portion 42.

The wheel bearing assemblies 82 may have any suitable configuration. For instance, each wheel bearing assembly 82 may include a plurality of rolling elements 90, such as balls or rollers as is best shown in FIG. 4, that may be disposed between an inner race 92 and an outer race 94 of a wheel bearing assembly 82. The inner race 92 may engage the third cylindrical portion 42 and may extend around its external surface. In addition, the inner race 92 of an inboard wheel bearing assembly 82 may be disposed proximate and may engage the radial portion 70 as is best shown in FIG. 5. The outer race 94 may be disposed proximate and may engage the hub 80 and may extend around the rolling elements 90 and the inner race 92.

Referring to FIGS. 3-5, the bearing collar 84 may also be disposed on the axle 20. As is best shown in FIG. 5, the bearing collar 84 may be fixedly positioned with respect to the axle 20 and may engage and extend continuously around the second transition region 46 of the axle 20. For example, the bearing collar 84 may be configured as a ring that may extend around and may engage the third arcuate portion 66 and/or the fourth arcuate portion 68 of the second transition region 46. The bearing collar 84 may engage a portion of the inboard wheel bearing assembly 82. For example, the bearing collar 84 may engage the inner race 92 of the inboard wheel bearing assembly 82 to inhibit axial movement of the inner race 92 toward the first cylindrical portion 38, or to the left from the perspective shown in FIG. 5.

The seal 86 may be disposed on the bearing collar 84. For example, the seal 86 may be configured as a ring that extends around the bearing collar 84 and that extends in a radial direction from the bearing collar 84 to the hub 80. The seal 86 may inhibit contaminants from entering the cavity in the hub 80 that receives the wheel bearing assemblies 82.

Referring to FIGS. 1 and 2, the brake subsystem 24 may facilitate braking of the wheels of the wheel end assembly 22. The brake subsystem 24 may be mounted to the axle 20 and may include a pair of friction brakes that may be associated with different wheel end assemblies 22. The friction brakes may be configured to slow or inhibit rotation of an associated wheel. In addition, the friction brakes may have any suitable configuration. For instance, the friction brakes may be configured as a disc brake or a drum brake.

In FIGS. 1 and 2, each friction brake is depicted as a drum brake. In a drum brake configuration, a brake drum 100 may extend continuously around friction members, such as brake pad assemblies 102 that may be actuated to engage the brake drum 100 and slow the rotation of an associated wheel. As is best shown in FIG. 2, each brake pad assembly 102 may include a brake shoe 110 and friction material 112.

The brake shoe 110 may be a structural member of a brake pad assembly 102. The brake shoe 110 may facilitate mounting of the brake pad assembly 102 and may support the friction material 112.

The friction material 112, which may also be called a brake lining, may be fixedly disposed on the brake shoe 110 and may face toward the brake drum 100. The friction material 112 may engage the brake drum 100 during vehicle braking and may be spaced apart from the brake drum 100 when the friction braking is not being applied.

Each friction brake of the brake subsystem 24 may also include a brake torque plate or brake spider 114, at least one anchor pin 116, a camshaft 118, a slack adjuster 120, and an actuator 122.

Referring to FIGS. 2-5, the brake spider 114 may support various components of the friction brake. In addition, the brake spider 114 may be fixedly disposed on the axle 20. For instance, the brake spider 114 may be disposed on the second cylindrical portion 40 of the axle 20. The brake spider 114 may have opening through which an axle 20 may extend. In addition, the brake spider 114 may also support or facilitate mounting of one or more anchor pins 116 and the camshaft 118. For instance, the brake spider 114 may have one or more anchor pin openings that may receive a corresponding anchor pin 116 and a camshaft opening that may receive the camshaft 118.

Referring to FIG. 2, one or more anchor pins 116 may extend from the brake spider 114 and may support one or more brake pad assemblies 102. In the configuration shown in FIG. 2, each brake pad assembly 102 is supported by a different anchor pin 116 such that the brake pad assembly 102 may pivot or rotate when rotated by the camshaft 118.

The camshaft 118 may be configured to actuate the brake pad assemblies 102. The camshaft 118 may extend along and may rotate about a camshaft axis. In addition, the camshaft 118 may extend through the camshaft opening in the brake spider 114 and a mounting bracket that may extend from the axle 20. The camshaft 118 may include a brake cam, such as an S-cam, that may be disposed at a first end. The brake cam may be configured to engage and support one or more cam rollers that may be disposed between the brake shoe 110 and the brake cam. Rotation of the camshaft 118 about the camshaft axis in a first direction may actuate the cam rollers and the brake pad assemblies 102 such that the friction material 112 moves toward and engages an inner surface of the brake drum 100 to brake or slow or inhibit rotation of an associated wheel. Rotation of the camshaft 118 in a second direction or the opposite direction may allow the friction material 112 to move away from the brake drum 100.

The slack adjuster 120 may be provided to compensate for brake wear or wear of the friction material 112. The slack adjuster 120 may operatively connect the actuator 122 to the camshaft 118. For instance, the slack adjuster 120 may be disposed near the second end of the camshaft 118.

The actuator 122 may be provided to actuate the camshaft 118 and the brake pad assemblies 102. In at least one embodiment, the actuator 122 may be mounted on the first cylindrical portion 38 of the axle 20. The actuator 122 may be of any suitable type, such as a pneumatic, hydraulic, electrical, or electromechanical actuator. The actuator 122 may move between a retracted position and an extended position. In the retracted position, the camshaft 118 may be positioned such that a brake pad assembly 102 does not engage the brake drum 100 to brake or inhibit rotation of an associated wheel. In the extended position, the actuator 122 may rotate the camshaft 118 and actuate one or more brake pad assemblies 102 toward and into engagement with the brake drum 100 to inhibit rotation of an associated wheel.

The axle assembly 10 may include or may be coupled to the vehicle by way of a suspension system. For example, the axle assembly 10 may include a pair of trailing arm assemblies that may be fixedly positioned with respect to the axle. A hanger bracket may be pivotally mounted to each trailing arm assembly may facilitate mounting of the axle assembly 10 to a frame or chassis of the vehicle. A shock absorber and an air spring may be mounted to the hanger bracket and may be provided to dampen impulses and to dissipate kinetic energy transmitted to the axle assembly 10.

The axle assembly and axle configuration described above may allow a larger nominal diameter axle tube or an axle tube having a diameter of at least 6 inches (15.24 cm) to be used to form an axle while also allowing the weight of the axle to be reduced as compared to a smaller 5 inch (12.7 cm) nominal diameter axle. For instance, an axle having a 22,500 pound axle rating (10,205 kg rating) may use approximately 22% less steel and have a weight that is approximately 40 pounds (18.14 kg) less than a comparable 5 inch (12.7 cm) nominal diameter axle, while a 30,000 pound axle rating (13,608 kg rating) may have a weight that is approximately 70 pounds (31.75 kg) less than a comparable 5 inch (12.7 cm) nominal diameter axle. In addition, the axle configuration described above may allow different nominal wall thicknesses to be used with different axle load ratings. For instance, a 6 inch (15.24 cm) nominal diameter axle tube may have a 0.296 inch (0.75 cm) nominal wall thickness for a 22,500 pound axle rating (10,205 kg rating), a 0.344 inch (0.87 cm) nominal wall thickness with a 25,000 pound axle rating (11,340 kg rating), and a 0.405 inch (1 cm) nominal wall thickness with a 30,000 pound axle rating (13,608 kg rating). In addition, the exterior surface or outside circumference of the second cylindrical portion may not be machined or undergo material removal operations to accommodate the brake spider. In addition, the axle may be fabricated with large single piece dies rather than dies made from multiple stacked pieces.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an axle that is disposed around an axis, the axle including:
      a first cylindrical portion having a first outside diameter;
      a second cylindrical portion having a second outside diameter that is less than the first outside diameter;
      a third cylindrical portion having a third outside diameter that is less than the second outside diameter;
      a first transition region that extends from the first cylindrical portion to the second cylindrical portion, wherein the first transition region has an exterior surface that faces away from the axis and that has a first curved portion that is concave with respect to the axis and a second curved portion that is convex with respect to the axis; and
      a second transition region that extends from the second cylindrical portion to the third cylindrical portion;
   a brake spider that is disposed on the second cylindrical portion; and
   a bearing collar that is disposed on the second transition region.

2. The axle assembly of claim 1 wherein the first outside diameter is at least 6 inches.

3. The axle assembly of claim 1 further comprising a roller bearing assembly that is disposed on the third cylindrical portion and engages the bearing collar.

4. The axle assembly of claim 1 wherein the first curved portion extends from the first cylindrical portion toward the second curved portion and curves toward the axis.

5. The axle assembly of claim 4 wherein the second curved portion extends from the second cylindrical portion toward the first curved portion and curves away from the axis.

6. The axle assembly of claim 5 wherein the first curved portion extends to the second curved portion.

7. The axle assembly of claim 5 wherein the first curved portion and the second curved portion intersect at an inflection line that extends around the axis.

8. The axle assembly of claim 5 wherein the exterior surface of the first transition region has a nonlinear cross section.

9. The axle assembly of claim 1 wherein the axle is hollow and has an internal surface that defines an axle hole that extends through the axle, the first cylindrical portion has a first wall thickness, and the second cylindrical portion has a second wall thickness that is greater than the first wall thickness.

10. The axle assembly of claim 9 wherein the third cylindrical portion has a third wall thickness that is greater than the first wall thickness.

11. The axle assembly of claim 9 wherein the first transition region has a greater wall thickness than the first cylindrical portion.

12. The axle assembly of claim 11 wherein at least a portion of the second transition region has a greater wall thickness than the first transition region.

13. The axle assembly of claim 9 wherein the first transition region and the second transition region have wall thicknesses that are not constant.

14. An axle assembly comprising:
   an axle that is disposed around an axis, the axle including:
      a first cylindrical portion having a first outside diameter;
      a second cylindrical portion having a second outside diameter that is less than the first outside diameter, wherein the second cylindrical portion has an axial length;
      a third cylindrical portion having a third outside diameter that is less than the second outside diameter, the third cylindrical portion extending toward an end of the axle;
      a first transition region that extends from the first cylindrical portion to the second cylindrical portion and has a first axial length; and
      a second transition region that extends from the second cylindrical portion to the third cylindrical portion and has a second axial length, wherein the axial length of the second cylindrical portion is less than the first axial length and the second axial length and the second transition region has an exterior surface that faces away from the axis and that has a nonlinear cross section from the second cylindrical portion to the third cylindrical portion, wherein the exterior surface of the second transition region has a first arcuate portion that extends from the second cylindrical portion and is concave with respect to the axis and a radial portion that extends from the third cylindrical portion and is convex with respect to the axis, wherein the radial portion engages a roller bearing assembly.

15. The axle assembly of claim 14 wherein the first axial length is less than the second axial length.

16. The axle assembly of claim 14 further comprising a brake spider that is disposed on the second cylindrical portion.

17. The axle assembly of claim 14 wherein the exterior surface of the second transition region further comprises a second arcuate portion that extends from the first arcuate portion, a third arcuate portion that extends from the second arcuate portion, and a fourth arcuate portion that extends from the third arcuate portion to the radial portion, wherein a bearing collar extends around the fourth arcuate portion.

18. The axle assembly of claim 17 wherein the second arcuate portion is convex with respect to the axis, the third arcuate portion is concave with respect to the axis, and the fourth arcuate portion is convex with respect to the axis.

19. An axle assembly comprising:
an axle that is disposed around an axis, the axle including:
a first cylindrical portion having a first outside diameter;
a second cylindrical portion having a second outside diameter that is less than the first outside diameter, wherein the second cylindrical portion has an axial length;
a third cylindrical portion having a third outside diameter that is less than the second outside diameter, the third cylindrical portion extending toward an end of the axle;
a first transition region that extends from the first cylindrical portion to the second cylindrical portion and has a first axial length, wherein the first transition region has a first transition region slope that is measured from the first outside diameter to the second outside diameter; and
a second transition region that extends from the second cylindrical portion to the third cylindrical portion and has a second axial length, wherein the axial length of the second cylindrical portion is less than the first axial length and the second axial length and the second transition region has a second transition region slope that is measured from the second outside diameter to the third outside diameter, wherein the first transition region slope is less than the second transition region slope.

20. An axle assembly comprising:
an axle that is disposed around an axis, the axle including:
a first cylindrical portion having a first outside diameter;
a second cylindrical portion having a second outside diameter that is less than the first outside diameter, wherein the second cylindrical portion has an axial length;
a third cylindrical portion having a third outside diameter that is less than the second outside diameter, the third cylindrical portion extending toward an end of the axle;
a first transition region that extends from the first cylindrical portion to the second cylindrical portion and has a first axial length; and
a second transition region that extends from the second cylindrical portion to the third cylindrical portion and has a second axial length, wherein the axial length of the second cylindrical portion is less than the first axial length and the second axial length; and
a bearing collar that is disposed on the second transition region.

21. An axle assembly comprising:
an axle that is disposed around an axis, the axle including:
a first cylindrical portion having a first outside diameter;
a second cylindrical portion having a second outside diameter that is less than the first outside diameter, wherein the second cylindrical portion has an axial length;
a third cylindrical portion having a third outside diameter that is less than the second outside diameter, the third cylindrical portion extending toward an end of the axle;
a first transition region that extends from the first cylindrical portion to the second cylindrical portion and has a first axial length; and
a second transition region that extends from the second cylindrical portion to the third cylindrical portion and has a second axial length, wherein the axial length of the second cylindrical portion is less than the first axial length and the second axial length; and
a brake spider that is disposed on the second cylindrical portion.

* * * * *